United States Patent
Marsh (10) Patent No.: US 7,454,265 B2
(45) Date of Patent: Nov. 18, 2008

(54) LASER AND PHOTOGRAMMETRY MERGED PROCESS

(75) Inventor: Bobby J. Marsh, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 69 days.

(21) Appl. No.: 11/432,061

(22) Filed: May 10, 2006

(65) Prior Publication Data
US 2007/0263229 A1    Nov. 15, 2007

(51) Int. Cl.
G06F 19/00    (2006.01)
(52) U.S. Cl. .................. 700/195; 700/159; 700/166
(58) Field of Classification Search ............... 700/159, 700/166, 195
See application file for complete search history.

(56) References Cited

U.S. PATENT DOCUMENTS

| | | | | |
|---|---|---|---|---|
| 6,009,189 | A * | 12/1999 | Schaack | 382/154 |
| 6,069,700 | A * | 5/2000 | Rudnick et al. | 356/511 |
| 6,166,809 | A * | 12/2000 | Pettersen et al. | 356/612 |
| 6,476,803 | B1 * | 11/2002 | Zhang et al. | 345/419 |
| 6,618,505 | B2 * | 9/2003 | Cork et al. | 382/190 |
| 6,826,299 | B2 | 11/2004 | Brown et al. | |
| 6,912,293 | B1 * | 6/2005 | Korobkin | 382/100 |
| 6,980,881 | B2 | 12/2005 | Greenwood et al. | |
| 6,990,215 | B1 * | 1/2006 | Brown et al. | 382/106 |
| 2003/0076413 | A1 * | 4/2003 | Kanade et al. | 348/139 |
| 2004/0039465 | A1 | 2/2004 | Boyer et al. | |
| 2004/0068338 | A1 * | 4/2004 | Macy et al. | 700/98 |
| 2004/0233461 | A1 * | 11/2004 | Armstrong et al. | 356/620 |

FOREIGN PATENT DOCUMENTS

| | | | |
|---|---|---|---|
| EP | 1447644 A1 | 8/2004 | |
| WO | WO9714015 A1 | 4/1997 | |

OTHER PUBLICATIONS

"Developments in Non-Contact Measurement using Videogrammetry"-Ganci et al, Geodetic Services Inc, Boeing Large Scale Metrology Seminar, 2000.*
"V-STARS/S Acceptance Test Results"-Brown, Geodetic Services, 1997. Submitted to patent office in 2002 in related application.*
"Real-time Geometrical tracking and Pose Estimation using Laser Triangulation and Photogrammetry"-Blais et al, National research Council of Canada, 2001.*

* cited by examiner

Primary Examiner—Michael D Masinick
(74) Attorney, Agent, or Firm—Wildman, Harrold, Allen & Dixon, LLP (57) ABSTRACT

The invention relates to processes for measuring one or more surfaces of a part utilizing both Photogrammetry and laser tracking devices. The measured part may comprise the barrel of an airplane. In other embodiments, varying types of surfaces may be measured in both airplane and non-airplane applications. In one embodiment, such a process may comprise measuring at least one surface of a part utilizing Photogrammetry, and simultaneously measuring the at least one surface utilizing laser tracking.

24 Claims, 6 Drawing Sheets

LASER AND PHOTOGRAMMETRY MERGED PROCESS

BACKGROUND OF THE INVENTION

Varying processes are utilized to measure one or more surfaces of a part. For instance, surfaces of a part are sometimes measured utilizing Photogrammetry. The Photogrammetry process may allow large surfaces to be measured in a timely manner. However, Photogrammetry processes may lack precision and/or suffer from other problems. Laser tracking processes are also sometimes used to measure surfaces of a part. The laser tracking process may allow precision surface measurements. However, laser tracking processes may take substantial time, may have difficulty measuring large surfaces, and/or may have other problems.

A surface measuring process is needed which may alleviate one or more of the problems of the prior surface measuring processes.

SUMMARY OF THE INVENTION

In one aspect of the invention, a process for measuring at least one surface of a part comprises measuring the at least one surface of the part utilizing Photogrammetry, and simultaneously measuring the at least one surface of the part utilizing laser tracking.

In another aspect, the invention comprises a measured surface of a part, wherein the surface was simultaneously measured utilizing Photogrammetry and laser tracking.

In a further aspect of the invention, a process is disclosed for measuring at least one surface of a part. The process comprises projecting a multitude of light beams onto the at least one surface. Simultaneously, the position of at least one target positioned near the at least one surface is measured utilizing Photogrammetry and laser tracking. The position of the multitude of light beams is measured utilizing Photogrammetry. The Photogrammetry and laser tracking measurements are combined to determine the at least one surface's measurements.

These and other features, aspects and advantages of the invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

FIGS. 1 through 6 depict a step by step process under one embodiment of the invention for measuring an outer surface of a mandrel assembly and for measuring an outer surface of a barrel of an airplane. In other embodiments, the process may be varied to measure one or more differing types of surfaces on any type of part. The surface measuring process may be utilized to measure surfaces in both airplane and non-airplane applications.

Figure 1:
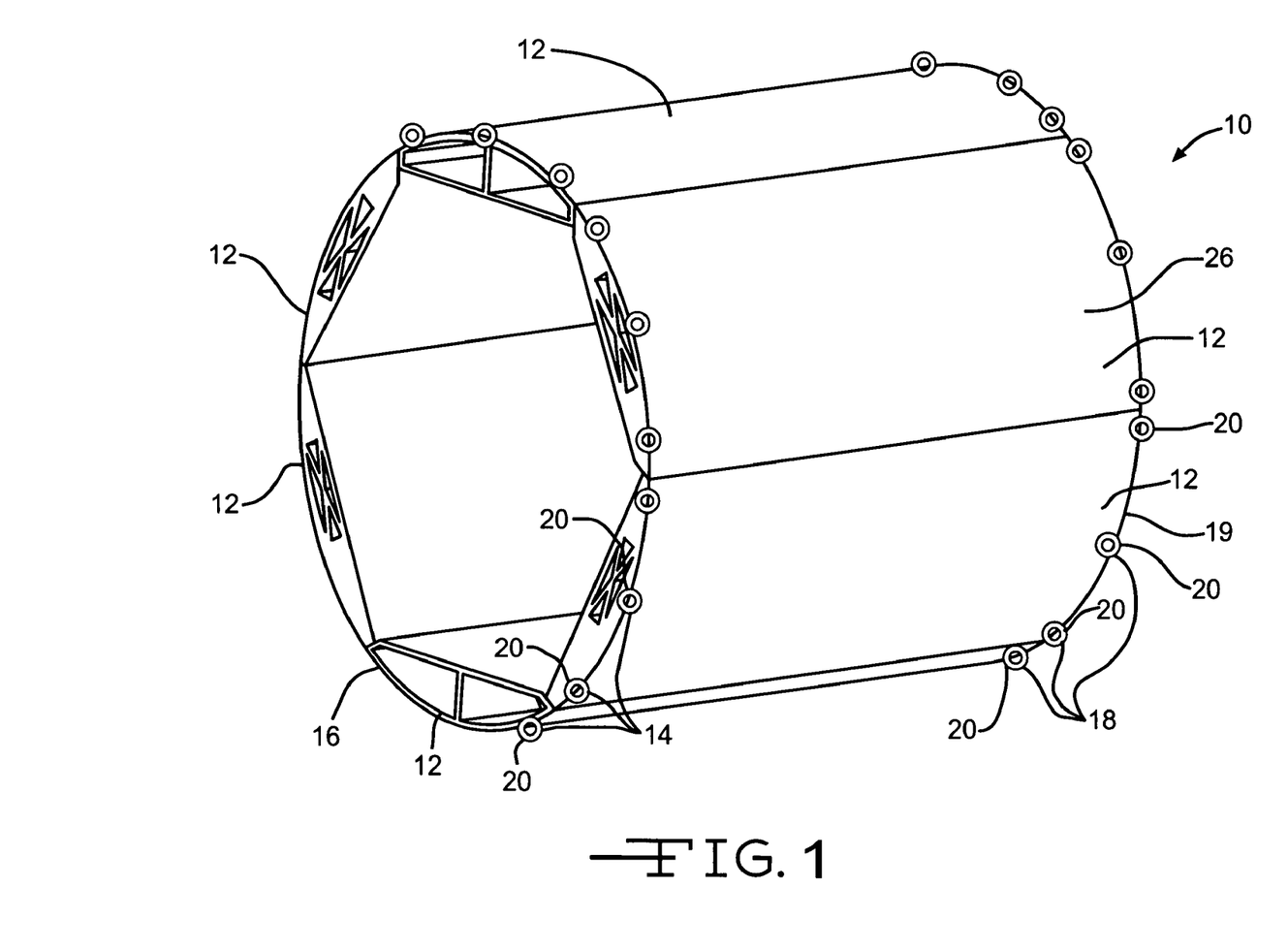
FIG. 1 is a perspective view of one embodiment of a mandrel assembly having targets installed under a method of the invention.

FIG. 1 depicts a mandrel assembly 10, which may be made up of six steel mandrel sections 12 attached together to form a generally cylindrical shape. The mandrel sections 12 may be bolted together. In other embodiments, any attachment mechanism known in the art may be utilized. The outer surface 26 of the mandrel assembly 10 may be defined by sixteen lay-up mandrel holes 14 at the forward portion 16 of the mandrel assembly 10 and another sixteen lay-up mandrel holes 18 at the aft portion 19 of the mandrel assembly 10. In other embodiments, any number of mandrel holes in any size, configuration, orientation, type, and/or location may be utilized.

A separate target 20 may be installed into each of the thirty-two mandrel holes 14 and 18, for a total of thirty-two installed targets 20 covering the forward 16 and aft 19 portions of the mandrel assembly 10. The targets 20 may be installed into the holes utilizing a snap-fit or other installation mechanism or device known in the art. Each of the thirty-two targets 20 may have reflectors (not shown) which are adapted to reflect Photogrammetry light beams, and separate reflectors (not shown) which are adapted to reflect lasers emitted from laser tracking devices. In such matter, locations of each of the targets 20 may be simultaneously measured using both Photogrammetry devices and laser tracking devices. The targets 20 may comprise any of the embodiments disclosed in application Ser. No. 11/437201, filed with the United States Patent Office on May 10, 2006, and entitled Combination Laser and Photogrammetry Target, which is hereby incorporated by reference. In other embodiments, the targets 20 may be in any size, type, shape, configuration, orientation, and/or location.

Figure 2:
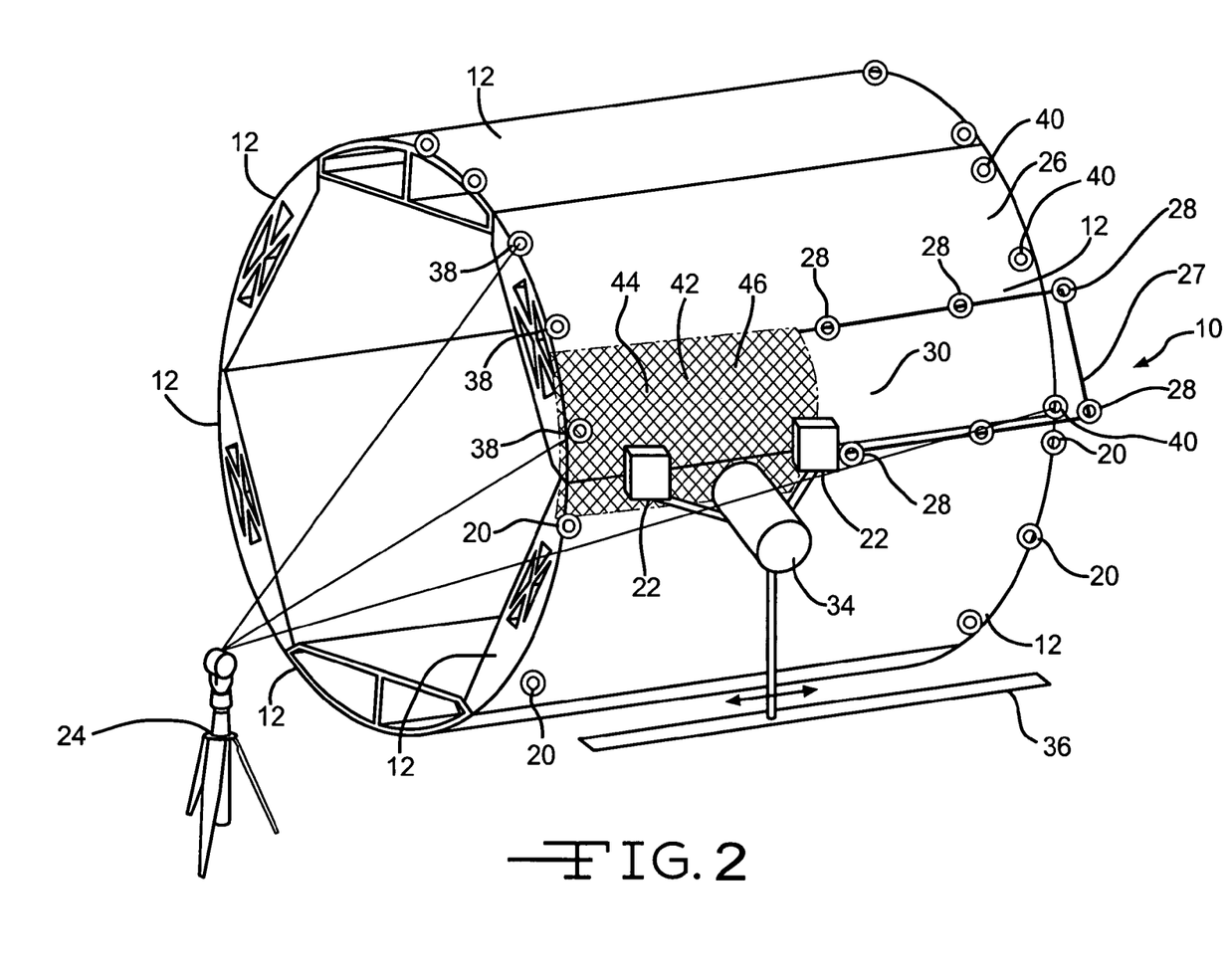
FIG. 2 is a perspective view of the mandrel assembly of FIG. 1 with a laser tracker and two Photogrammetry devices taking measurements of the mandrel assembly.

As shown in FIG. 2, one or more Photogrammetry devices 22 and one or more laser trackers 24 may be utilized to measure the outer surface 26 of the mandrel assembly 10 by simultaneously measuring the locations of one or more of the targets 20 utilizing both Photogrammetry and laser tracking. The laser tracking measurements may be taken by emitting one or more lasers from the one or more laser trackers 24 towards the outer surface 26 of the mandrel assembly 10. The one or more lasers may be reflected off the laser reflectors of one or more of the targets 20 back towards the laser trackers 24, which may measure one or more target locations in X, Y, and/or Z planes based on the properties of the returned laser.

Simultaneously, the Photogrammetry measurements may be taken by emitting one or more light beams from one or more Photogrammetry devices 22 towards the outer surface 26 of the mandrel assembly 10. The one or more light beams may be reflected off the Photogrammetry reflectors of one or more of the targets 20 back towards the Photogrammetry devices 22, which may measure one or more of the target locations in X, Y, and/or Z planes based on the properties of the returned light beams. The Photogrammetry devices 22 may comprise one or more V-Star cameras. In one embodiment, two V-Star cameras may be utilized. In other embodiments, any number or type of Photogrammetry devices may be utilized.

In order to measure the entire outer surface 26 of the mandrel assembly 10, various portions of each mandrel section 12 may be measured separately. By rotating the mandrel assembly 10 a predetermined angle a predetermined number of times, the entire outer surface 26 of the mandrel assembly 10 may be measured. In one embodiment, the mandrel assembly 10 may be twenty-four feet long. A twenty-four foot long rectangular frame 27, containing ten additional targets 28 distributed around the frame 27, may be placed in close proximity to a portion of one 30 of the mandrel sections 12. One laser tracker 24 may be placed nearby the mandrel assembly 10. Two Photogrammetry devices 22, which may comprise two linked V-Star cameras, may be joined to a Pro-Spot light projector 34 and to a track 36 extending along a length of the mandrel assembly 10.

The laser tracker 24 may simultaneously measure the locations of three targets 38 at the forward portion of the mandrel section 30 being measured, the locations of three targets 40 at the aft portion of the mandrel section 30 being measured, and the locations of the ten targets 28 distributed around the frame 27. Simultaneously, the Pro-Spot projector 34 may emit one or more light beams defined by hundreds of dots onto an eight-foot long portion 42 of the surface 44 of the mandrel section 30 covered by the frame 27. The two linked V-Star cameras 22 may take a combined digital photograph covering a six-foot long area 46 within the frame 27. The combined digital photograph may show the positioning of the hundreds of dots on the surface of the mandrel section. As such, the position of the light beams emitted by the Pro-Spot projector 34 may be measured utilizing Photogrammetry.

The digital Photogrammetry photograph, in conjunction with the laser tracker measurements of the targets 20, may allow a determination to be made as to the surface measurements in X, Y, and/or Z planes of the portion of the mandrel section within the digital photograph. The Pro-Spot projector 34 and the two linked V-Star cameras 22 may move in six foot increments horizontally along the track 36, in order to take three more digital photographs which may cover the length of the mandrel section 30. The mandrel assembly 10 may be rotated a total of ten times in thirty-six degree increments in order to take a total of forty digital photographs of the entire outer surface 26 of the mandrel assembly 10. In such manner, measurements, in X, Y, and/or Z planes, of the entire outer surface of the mandrel assembly may be determined utilizing Photogrammetry.

After, or during, each of the ten rotations of the mandrel assembly 10, the laser tracker 24 may simultaneously measure the locations of the ten targets 28 distributed along the frame 27 in addition to the locations of the six targets 38 and 40 located at the forward and aft portions of each respective mandrel section. In such manner, by rotating the mandrel assembly 10 a total of ten times in thirty-six degree increments, measurements of the locations of each of the targets distributed around the entire outer surface of the mandrel assembly may be determined utilizing laser tracking.

The Photogrammetry and laser tracking measurements of the locations of the targets 20 and of the outer surface 26 of the mandrel assembly 10 may be integrated together utilizing one or more computers. In one embodiment, the location measurements in the X, Y, and/or Z planes taken by the laser tracker may be downloaded from the laser tracker computer to a Photogrammetry computer, which may combine the data into one or more combined measurements. The laser tracker computer may be a spatial analyzer lap-top and the Photogrammetry computer may be a V-Stars Photogrammetry laptop. The Photogrammetry measurements (also referred to as point-cloud) may be transformed to the laser tracking measurements to determine a more accurate, and/or more efficient combined measurement of the outer surface 26 of the mandrel assembly 10.

One or more software programs may be utilized to create a three-dimensional computer generated image of the outer surface 26 of the mandrel assembly 10. By utilizing Photogrammetry and laser tracking devices simultaneously, relatively quick and accurate measurements of the mandrel assembly's outer surface 26 may be determined. The entire outer surface 26 of the mandrel assembly 10 may be measured in approximately fifty minutes, comprising approximately five minutes per each of the ten mandrel sections. In other embodiments, the measurement process may take less than an hour, or a differing amount of time, and may follow differing steps in order to measure the outer surface 26 of the mandrel assembly 10 simultaneously utilizing both Photogrammetry and laser tracking.

Figure 3:
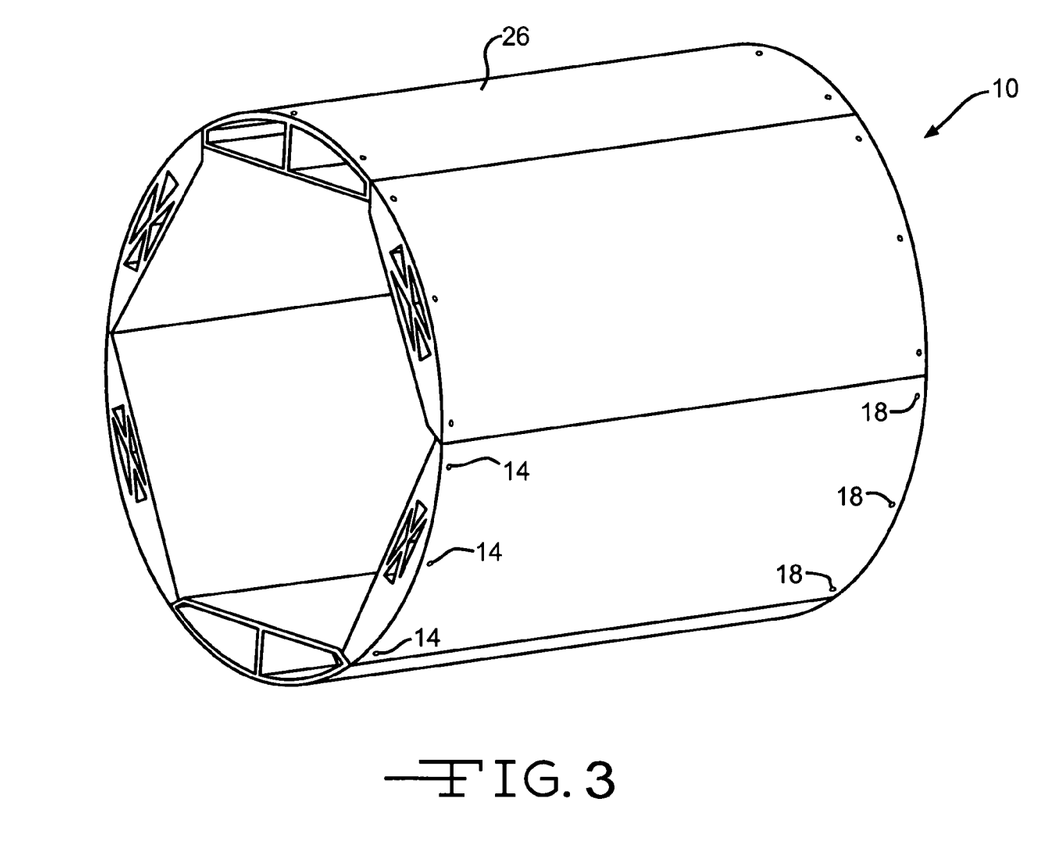
FIG. 3 is a perspective view of the mandrel assembly of FIG. 1 with the targets removed.
Figure 4:
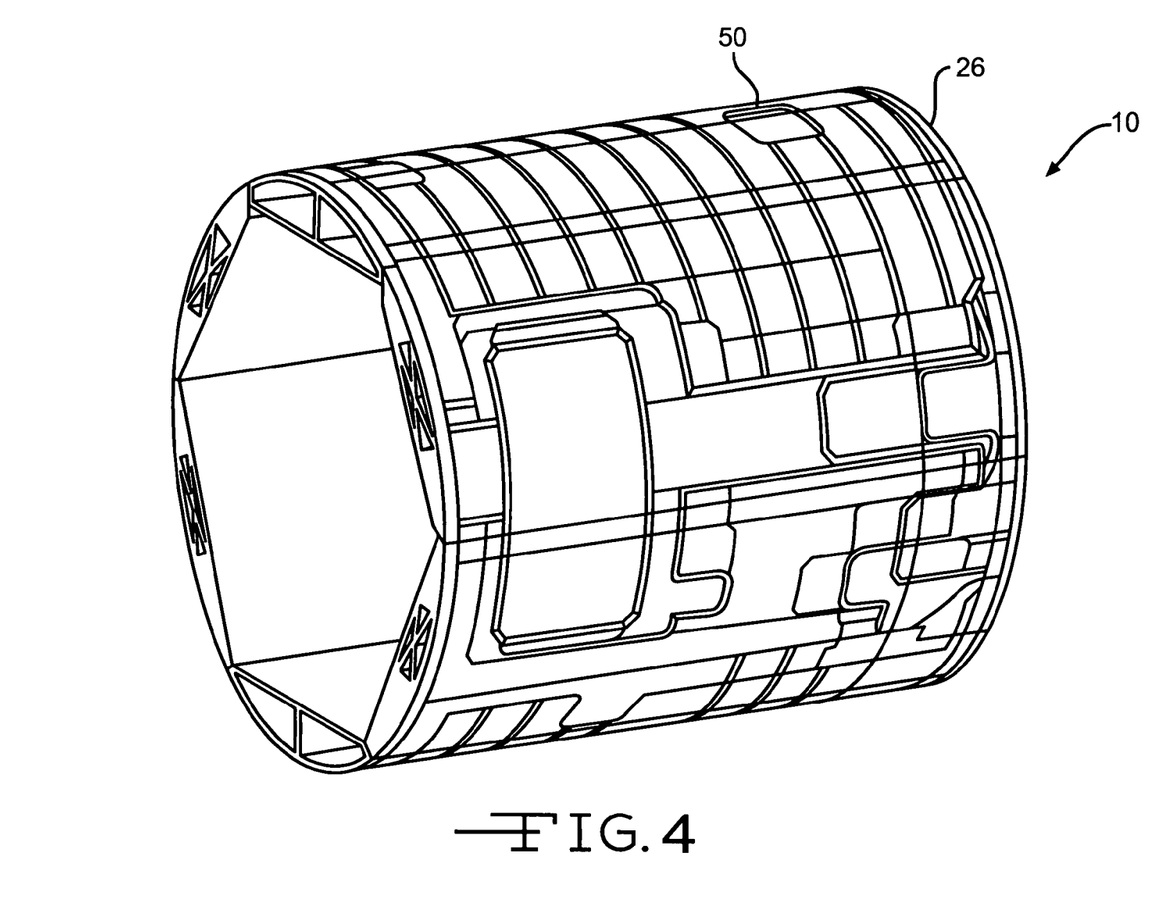
FIG. 4 is a perspective view of a cured barrel disposed over the mandrel assembly of FIG. 1.

As shown in FIG. 3, after measuring the outer surface 26 of the mandrel assembly 10, the targets 20 may be removed from the forward and aft mandrel holes 14 and 18. A fiber placement lay-up machine may be used to distribute curing material around the outer surface 26 of the mandrel assembly 10. The mandrel assembly 10 may be inserted into an auto-clave to cure the material around the outer surface 26 of the mandrel assembly 10 in order to manufacture a barrel. FIG. 4 depicts a fully-cured barrel 50 disposed over the outer surface 26 of the mandrel assembly 10 which may be produced after removing the mandrel assembly 10 from the auto-clave. The barrel 50 may represent a portion of an airplane such as one or more portions of the fuselage.

Figure 5:
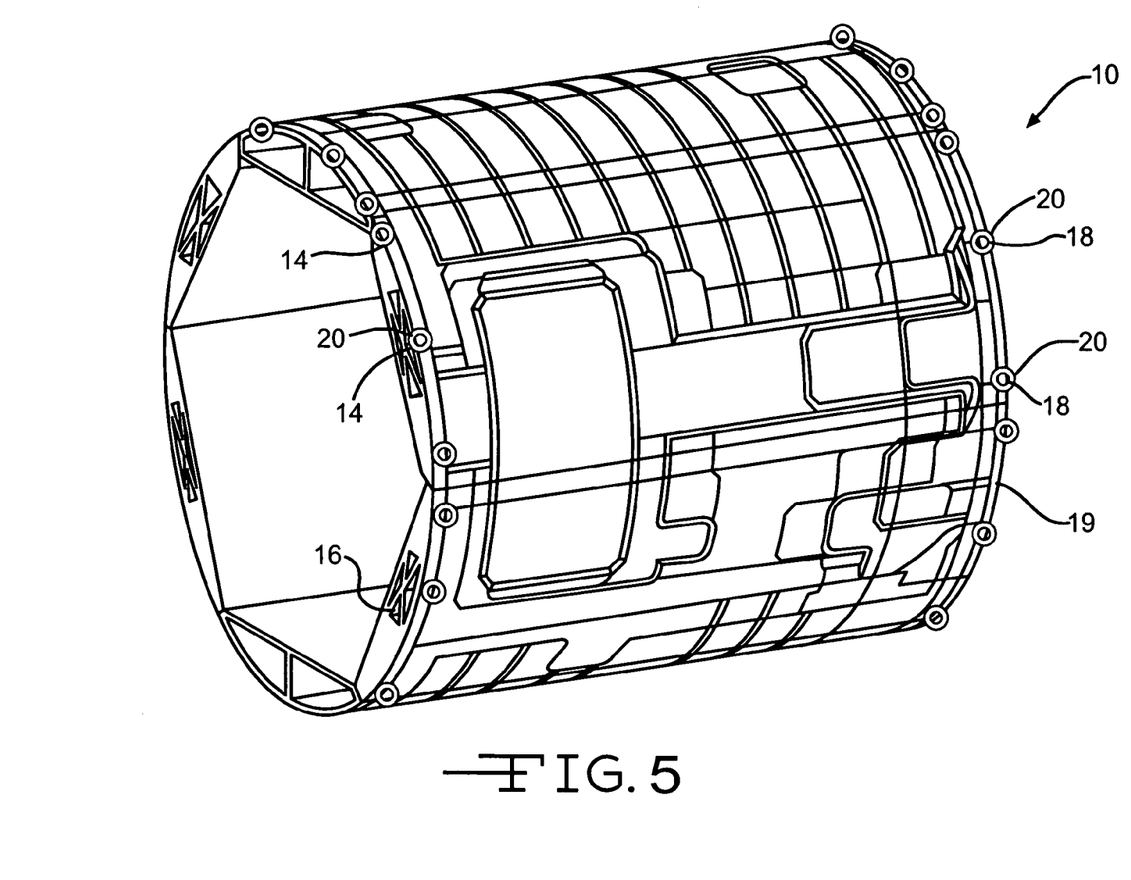
FIG. 5 is a perspective view of the cured barrel of FIG. 4 with targets installed on the mandrel assembly.

As shown in FIG. 5, thirty-two targets 20 may be re-installed, utilizing a snap-fit or other installation mechanism known in the art, into each of the respective thirty-two lay-up mandrel holes 14 and 18 at the forward and aft portions 16 and 19 of the mandrel assembly 10. In other embodiments, a varying number of targets 20 may be utilized in varying locations, orientations, and configurations.

Figure 6:
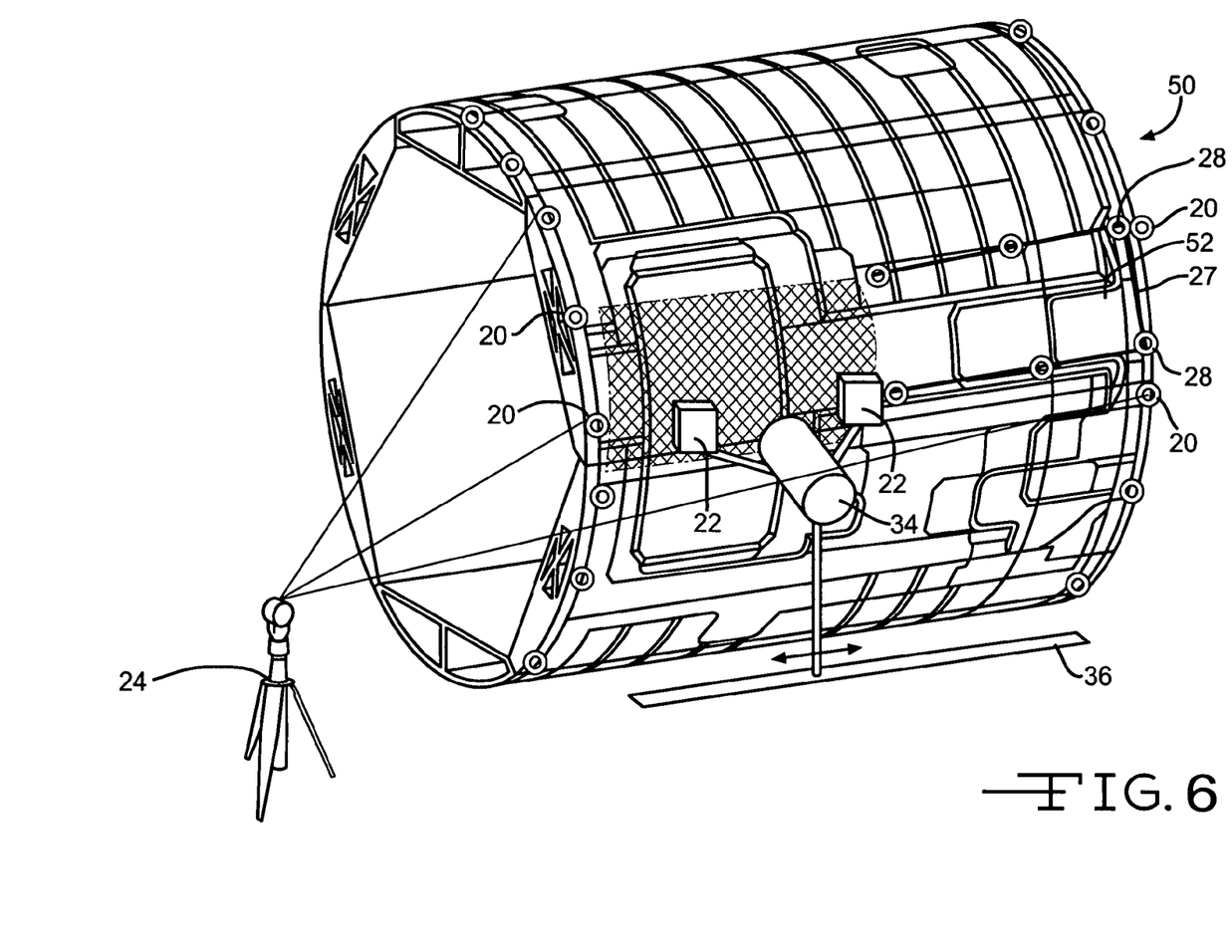
FIG. 6 is a perspective view of the mandrel assembly/barrel arrangement of FIG. 4 with a laser tracker and two Photogrammetry devices taking measurements of the barrel.

As depicted in FIG. 6, the outer surface 52 of the barrel 50 may be measured utilizing the same Photogrammetry and laser tracking procedure as described above to measure the outer surface 26 of the mandrel assembly 10. In one embodiment, the barrel 50 may be rotated thirty-six degrees ten separate times to fully measure the outer surface 52 of the barrel 50. At each rotated position, four digital Photogrammetry photographs may be taken incrementally along the length of the barrel 50 utilizing two V-Star cameras 22, the Pro-Spot light projector 34, the frame 27, and the track 36, all working in conjunction with each other as previously described in the discussion of the mandrel assembly 10 measurement process. In one embodiment where the barrel is twenty-four feet long, four digital Photogrammetry photographs may be taken with each photograph covering a distance of approximately six to eight feet of the length of the barrel 50. A total of forty digital Photogrammetry photographs may be taken to cover the entire outer surface 52 of the barrel 50.

As previously described in the discussion of the mandrel assembly 10 measurement process, the laser tracker 24 may simultaneously measure the locations of one or more of the targets 20 distributed around the mandrel assembly 10, while simultaneously measuring the locations of one or more of the additional targets 28 distributed around the frame 27. By rotating the barrel 50 one full rotation, the locations of all of the targets 20 distributed around the mandrel assembly may be ascertained.

The Photogrammetry and laser tracking measurements of the locations of the targets and of the outer surface 52 of the barrel 50 may be integrated together utilizing one or more computers as previously described during the discussion of the mandrel assembly 10 measurement process. In one embodiment, the location measurements in the X, Y, and/or Z planes taken by the laser tracker may be downloaded from the laser tracker computer to a Photogrammetry computer. The laser tracker computer may be a spatial analyzer lap-top and the Photogrammetry computer may be a V-Stars Photogrammetry lap-top. The Photogrammetry measurements (also referred to as point-cloud) may be transformed to the laser tracking measurements to determine a more accurate, and/or more efficient combined measurement of the outer surface 52 of the barrel 50. One or more software programs may be utilized to create a three-dimensional computer generated image of the outer surface 52 of the barrel 50.

By utilizing Photogrammetry and laser tracking devices simultaneously, relatively quick and accurate measurements of the barrel's outer surface 52 may be determined. The entire outer surface 52 of the barrel 50 may be measured in approximately fifty minutes, comprising approximately five minutes per portion of the barrel disposed over each of the ten respective mandrel sections. In other embodiments, the measurement process may take less than an hour, or a differing amount of time, and may follow differing steps in order to measure the outer surface 52 of the barrel 50 simultaneously utilizing both Photogrammetry and laser tracking.

Since the barrel's inner surface may be assumed to be a close replica of the mandrel assembly's outer surface, the measurements of the barrel's inner surface may be taken to be the determined measurements of the mandrel assembly's outer surface. As such, the barrel's entire outer and inner surfaces may be determined utilizing the method of the instant invention. In still other embodiments, measurements of varying surfaces of any type of part may be determined utilizing varying versions of the invention's process.

One or more holes may be machined in the barrel 50 utilizing the measurements determined by the combined Photogrammetry and laser tracking process. In one embodiment, doors, and windows may be machined in the barrel 50 based on the Photogrammetry and laser tracking measurements. In other embodiments, differing parts of the barrel 50 may be manufactured and/or machined based on the Photogrammetry and laser tracking measurements.

In other embodiments, the Photogrammetry and/or laser tracking procedure may be modified. For instance, a varying number of targets 20 may be utilized in varying orientations, configurations, and locations; the barrel 50 may be rotated a varying number of times and degrees; a varying number of Photogrammetry photographs may be taken utilizing different quantities and types of Photogrammetry devices; and varying types and quantities of laser trackers may be utilized. In still other embodiments, other portions of the Photogrammetry and/or laser tracking procedure may be modified to measure the outer surface 52 of the barrel 50.

The instant invention may alleviate one or more of the problems associated with one or more of the prior processes for measuring surfaces. The process of the invention may reduce the time required to measure a part, may make the process to measure a part simpler, may make the process to measure a part more efficient, and/or may decrease the cost of the process to measure a part. The process of the invention may alleviate additional problems of one or more of the prior processes for measuring surfaces.

It should be understood, of course, that the foregoing relates to exemplary embodiments of the invention and that modifications may be made without departing from the spirit and scope of the invention as set forth in the following claims.

I claim:

1. A process for measuring at least one surface of a part, comprising a barrel of an airplane, comprising:
   measuring the at least one surface of the part utilizing Photogrammetry and at least one moving camera by reflecting at least one light beam off at least one target;
   measuring the at least one surface of the part utilizing laser tracking and at least one laser tracker by reflecting at least one laser beam off said at least one target; and
   measuring an entire outer surface of said barrel in less than an hour.

2. The process of claim 1, wherein the part comprises a part of an airplane.

3. The process of claim 1, wherein said at least one target is disposed on a mandrel assembly.

4. The process of claim 3, wherein the at least one surface of the part is disposed on the mandrel assembly.

5. The process of claim 4, wherein the at least one target is disposed on an outer surface of the mandrel assembly.

6. The process of claim 5, wherein the at least one target is disposed on the outer surface of the mandrel assembly near the at least one surface of the part.

7. The process of claim 1, wherein the step of measuring the at least one surface of the part utilizing Photogrammetry uses at least one moving V-Star camera.

8. The process of claim 1, further including the step of projecting a multitude of light beams onto said at least one surface.

9. The process of claim 7, wherein the step of measuring the at least one surface of the part utilizing Photogrammetry comprises taking one or more pictures of said surface utilizing said at least one moving V-Star camera.

10. The process of claim 9, wherein the step of measuring the at least one surface of the part utilizing Photogrammetry comprises taking one or more pictures of said surface utilizing two moving V-Star cameras.

11. The process of claim 1, further including the step of combining the Photogrammetry and laser tracking measurements to determine the at least one surface's measurements.

12. The process of claim 11, wherein the step of combining the Photogrammetry and laser tracking measurements to determine the at least one surface's measurements comprises at least one computer combining the Photogrammetry and laser tracking measurements.

13. The process of claim 1, further including the step of sending the Photogrammetry measurements to at least a first computer.

14. The process of claim 1, further including the step of sending the laser tracking measurements to at least a second computer.

15. The process of claim 1, further including the step of moving said part.

16. The process of claim 15, further including the step of measuring at least one of said part's entire outer surface and said part's entire inner surface.

17. A measured surface of a part comprising a barrel of an airplane, wherein the surface was measured utilizing Photogrammetry and at least one moving camera, by reflecting at least one light beam off at least one target, and laser tracking, by reflecting at least one laser beam off said at least one target, wherein an entire outer surface of the barrel of the airplane was measured in less than an hour.

18. The measured surface of claim 17, wherein the part comprises a part of an airplane.

19. The measured surface of claim 17, wherein the measurements of the surface were arrived at by combining the Photogrammetry and laser tracking measurements.

20. The measured surface of claim 19, wherein at least one computer combined the Photogrammetry and laser tracking measurements.

21. A process for measuring at least one surface of a part, comprising a barrel of an airplane, comprising:
   projecting a multitude of light beams onto said at least one surface;
   measuring the position of at least one target utilizing Photogrammetry, at least one moving camera, and laser tracking;
   measuring the position of said multitude of light beams utilizing Photogrammetry and said at least one moving camera;
   combining the Photogrammetry and laser tracking measurements to determine said at least one surface's measurements; and
   measuring an entire outer surface of said barrel in less than an hour.

22. The process of claim 21, wherein the part comprises a part of an airplane.

23. The process of claim 21, wherein the step of combining the Photogrammetry and laser tracking measurements to determine said at least one surface's measurements is accomplished utilizing at least one computer.

24. The process of claim 21, wherein the step of projecting said multitude of light beams onto said at least one surface is accomplished utilizing at least one projector.

* * * * *